Sept. 3, 1940.  D. L. BEEMAN  2,213,877
SYSTEM OF ELECTRIC DISTRIBUTION
Filed June 1, 1938  2 Sheets-Sheet 1

Inventor:
Donald L. Beeman,
by Harry E. Dunham
His Attorney.

Sept. 3, 1940.    D. L. BEEMAN    2,213,877
SYSTEM OF ELECTRIC DISTRIBUTION
Filed June 1, 1938    2 Sheets-Sheet 2

Inventor:
Donald L. Beeman,
by Harry E. Dunbar
His Attorney.

Patented Sept. 3, 1940

2,213,877

UNITED STATES PATENT OFFICE 2,213,877

SYSTEM OF ELECTRIC DISTRIBUTION

Donald L. Beeman, Scotia, N. Y., assignor to General Electric Company, a corporation of New York Application June 1, 1938, Serial No. 211,137

11 Claims. (Cl. 175—294)

My invention relates to systems of electric distribution and particularly to such systems involving a low voltage alternating current network which is supplied with current at a plurality of points by means of transformers respectively connected to the same or different sources of current by high voltage feeder circuits. In such systems of electric distribution, it is desirable to be able to disconnect a transformer from the network upon the occurrence of a fault on the associated feeder but not to disconnect the transformer in case of a fault on the network.

One object of my invention is to provide an improved control arrangement for controlling the connections between a transformer and the network in such a system of electric distribution which is simpler and cheaper than any of the existing control arrangements for accomplishing the same results.

In accordance with my invention, I provide voltage responsive means which depends upon the greater decrease produced in the feeder circuit voltage when a predetermined fault occurs on the feeder, than is produced when a similar fault occurs on the network, for effecting the disconnection of a transformer from the network only in response to said predetermined fault when it occurs on the feeder.

Figure 1:
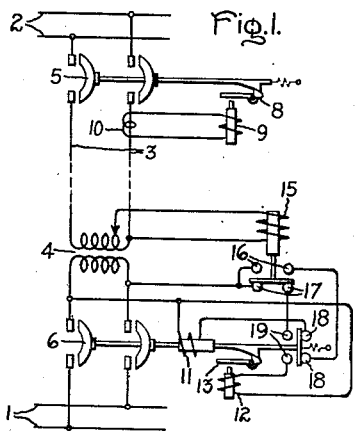

My invention will be better understood from the following description when taken in connection with the accompanying drawings Fig. 1 of which shows an alternating current distribution system embodying my invention and Figs. 2–9, inclusive, are modifications thereof, and its scope will be pointed out in the appended claims.

Referring to Fig. 1 of the drawings, I represents a single phase network which is arranged to be supplied with electric energy from a suitable supply circuit 2 by means of a plurality of parallel feeder circuits 3 only one of which is shown in the drawings. While I have shown a two-wire single phase system it will be apparent that my invention is applicable to any other type of single or polyphase system.

Each feeder 3 includes a step down transformer 4, the primary winding of which is permanently connected to the feeder circuit 3 which in turn is arranged to be connected to the supply circuit 2 by means of a suitable circuit breaker 5. The secondary winding of the transformer 4 is arranged to be connected to the network I by means of a suitable circuit breaker 6. The transformer 4 and the secondary circuit breaker 6 are usually located near the network I, whereas the feeder circuit breaker 5 is usually in the main station or substation containing the supply circuit 2.

The circuit breaker 5 which may be of any suitable type, examples of which are well known in the art, is preferably arranged so that it is opened in response to an overload condition on the associated feeder circuit 3. As shown in the drawings, the feeder circuit breaker 5 is on overload circuit breaker of the well known latched-in type and is arranged to be opened by releasing a latch 8 either manually or automatically by means of an overload relay 9 which is connected in series relation with the feeder circuit 3 by means of a current transformer 10. Any suitable means, either manually or automatically controlled, may be provided for closing the circuit breaker 5.

The circuit breaker 6 may also be of any suitable type, examples of which are well known in the art. As shown in the drawings, the circuit breaker 6 is of the well known latched-in type and includes a closing coil 11 which, when energized, closes the circuit breaker 6 and a trip coil 12 which, when energized, releases a latch 13 which holds the circuit breaker 6 in its closed position.

In accordance with my invention, I provide a control arrangement for the circuit breaker 6 which depends for its operation upon the greater voltage change produced across the feeder terminals of the transformer 4 when a fault occurs on the feeder 3 than is produced when a similar fault occurs on the network I. In the embodiment of my invention shown in Fig. 1, this control arrangement comprises a voltage relay 15 connected to the primary winding of the transformer 4 in any suitable manner so that the voltage impressed across the winding of the relay 15 is proportional to the feeder terminal voltage of the transformer 4. The voltage relay 15 is designed so that it closes its contacts 16 when the feeder terminal voltage of the transformer 4 is above a predetermined value preferably a value near its normal value and closes its contacts 17 when the feeder terminal voltage of the transformer 4 is below a predetermined low value. The contacts 16 are in an energizing circuit for the closing coil 11 which also includes the auxiliary contacts 18 on the circuit breaker 6 and the contacts 17 are in an energizing circuit for the trip coil 12 which also includes the auxiliary contacts 19 on the circuit breaker 6.

When it is desired to place the transformer 4 in operation, the feeder circuit breaker 5 is closed so that the feeder 3 is connected to the supply circuit 2. Under these conditions, the feeder terminal voltage of the transformer 4 is of such a value that the voltage relay 15 closes its contacts 16 and completes through the contacts 18 of the circuit breaker 6 an energizing circuit for the closing coil 11 of the circuit breaker 6 so that the secondary winding of the transformer 4 is connected to the network 1. After the circuit breaker 6 closes and the circuit of its closing coil 11 is opened by the auxiliary contacts 18, it is held in its closed position by its latch 13.

When a fault occurs on the feeder 3, the feeder terminal voltage of the transformer 4 decreases to substantially zero so that the voltage relay 15, which is designed to drop out at a very low value of voltage, opens its contacts 16 and closes its contacts 17 to complete an energizing circuit through the contacts 19 of the circuit breaker 6 for the trip coil 12 so that the circuit breaker 6 opens to disconnect the transformer 4 from the network 1.

However, when a fault occurs on the network 1, the feeder terminal voltage of the transformer 4 does not decrease more than a few per cent. Consequently, the voltage impressed across the winding of the relay 15 does not decrease below the drop out point of the relay so that the circuit breaker 6 remains closed under these conditions.

In order to open the circuit breaker 6 when there is no fault on the feeder 3, it is necessary to cause sufficient current to be supplied to the feeder 3 from the network 1 through the transformer 4 to reduce the feeder terminal voltage of the transformer 4 below the drop out value of the relay 15. This result may be accomplished in any well known manner as for example by opening the circuit breaker 5 and connecting a low impedance load to the feeder circuit 3 in the manner disclosed in United States Patent No. 1,581,831, granted April 20, 1926, on an application filed by D. K. Blake and assigned to the same assignee as this application.

Figure 2:
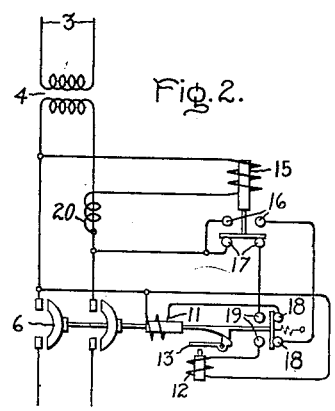

In the modification of my invention shown in Fig. 2, the voltage relay 15 is connected across the secondary terminals of the transformer 4 through a compensating transformer 20 which has one winding connected in series with the winding of relay 15 and the other winding connected in series with the secondary winding of the transformer 4 and the network 1. The compensating transformer 20 produces a voltage in the circuit of the winding of relay 15 which compensates for the voltage drop in the transformer 4 due to the current flowing to the windings so that a voltage proportional to the feeder terminal voltage of the transformer 4 is impressed across the winding of the relay 15. Therefore, the relay 15 in Fig. 2 functions in exactly the same manner as the relay 15 in the arrangement shown in Fig. 1.

Figure 3:
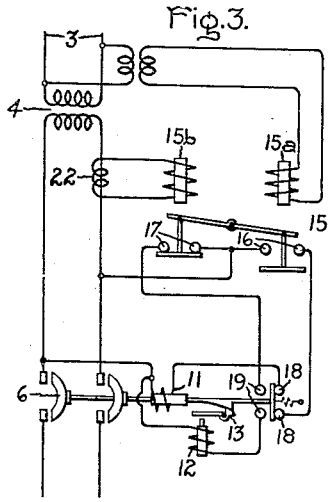

In the modification of my invention shown in Fig. 3 the voltage relay 15 is a differential relay having two opposing torque-producing elements 15a and 15b. The torque-producing element 15a includes a voltage winding which is connected across the feeder circuit 3 so that the torque produced thereby is proportional to the feeder terminal voltage of the transformer 4. The torque-producing element 15b includes a current winding which is connected in series relation with the secondary winding of the transformer 4 so that the torque produced thereby is proportional to the current flowing between the secondary winding of the transformer 4 and the network 1. As shown in Fig. 2, the current winding of the torque-producing element 15b is connected in series relation with the secondary winding of the transformer 4 by means of a current transformer 22. The relay 15 is designed so that, with a short circuit on the network, the torque exerted by the element 15a is slightly greater than the torque exerted by the element 15b in order that the relay may maintain its contacts 16 closed under these conditions. However, when a fault occurs on the feeder 3, the torque exerted by the element 15a decreases to substantially zero since the feeder terminal voltage decreases to substantially zero. At the same time the torque exerted by the element 15b is very high due to the fault current flowing through the secondary winding of the transformer 4. Consequently, the torque of element 15b predominates and the relay 15 opens its contacts 16 and closes its contacts 17 so that the trip coil 12 is energized to open the circuit breaker 6 and disconnect the transformer 4 from the network. The circuit breaker 6 may be reclosed by restoring the feeder circuit voltage to normal so that the relay 15 recloses its contacts 16 and completes an energizing circuit for the closing coil 11 of the circuit breaker 6.

Figure 4:
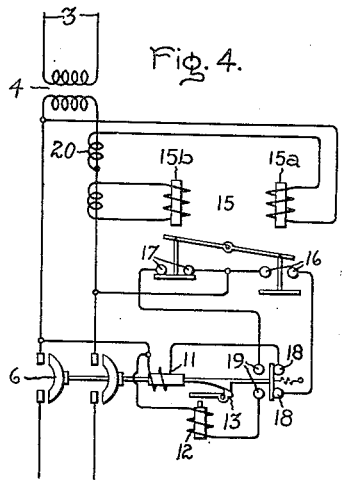

In Fig. 4 I have shown a modification of the arrangement shown in Fig. 3 in which the winding of the torque-producing element 15a is connected across the secondary winding of the transformer 4 through a compensating transformer 20 so that, although the winding of the torque-producing element 15a is connected to the secondary circuit of the transformer 4, its energization is proportional to the feeder terminal voltage of the transformer 4.

Figure 5:
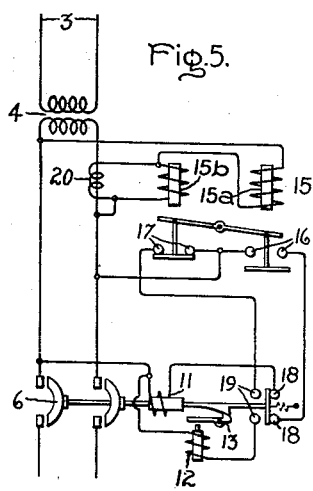

In Fig. 5 I have shown a modification of the arrangement shown in Fig. 4 in which the single current transformer 20 is used as a compensating transformer and also to energize the current winding of the torque-producing element 15b. It will be apparent that the arrangements shown in Figs. 4 and 5 function in exactly the same manner as the arrangement shown in Fig. 3.

Figure 6:
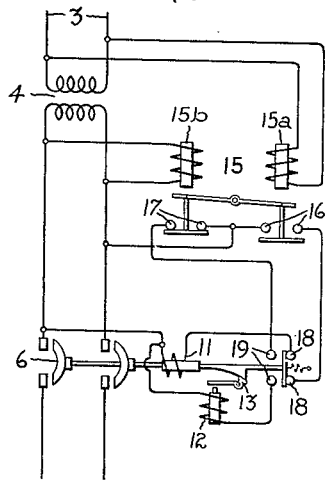

In the modification of my invention shown in Fig. 6, the voltage relay 15 is a differential relay having two opposing torque-producing elements 15a and 15b respectively arranged to exert torques proportional to the voltages across the primary and secondary terminals of the transformer 4. For normal no-load conditions, the torque exerted by the element 15a is slightly greater than the torque exerted by the element 15b so that the contacts 16 of the relay 15 are closed. When a fault occurs on the network 1, the voltage across the secondary winding of the transformer 4 decreases to a very low value, where as the feeder terminal voltage of the transformer 4 decreases only a few per cent due to the impedance of the transformer 4. Consequently, the relay 15 maintains its contacts 16 closed under these conditions. However, when a fault occurs on the feeder circuit 3, the feeder terminal voltage of the transformer 4 decreases to a very low value, whereas the secondary terminal voltage of the transformer 4 decreases only a small amount. Consequently, under these conditions, the torque of the element 15b predominates and causes the relay 15 to open its contacts 16 and close its contacts 17 to effect the opening of the circuit breaker 6. The circuit breaker 6 may be reclosed by restoring the voltage of the feeder circuit 3 to normal so that the relay 15 recloses its contacts 16 in the energizing circuit of the closing coil 11 of the circuit breaker 6.

Figure 7:
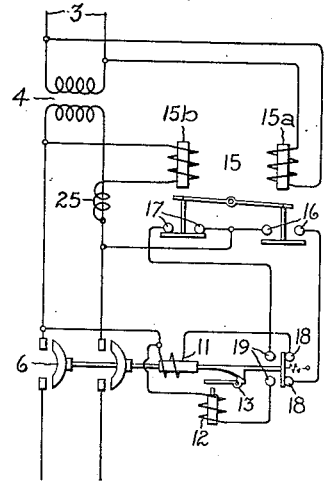

In Fig. 7 I have shown a modification of the arrangement shown in Fig. 6 in which the voltage winding of the torque-producing element 15b is connected across the secondary winding of the transformer 4 through a compensating transformer 25. This transformer 25 is so connected that, when current flows from the transformer 4 to the network 1, the voltage induced in the circuit of the winding of element 15b is in opposition to the secondary voltage of the transformer 4 which is impressed across the energizing circuit of this winding and is in a direction to increase the voltage applied to the winding of element 15b when power flows from the network 1 to the transformer 4. Consequently, when a fault occurs on the feeder 3, the torque exerted by the element 15b is increased to facilitate tripping because with such a compensating means the torque exerted by the element 15b is increased by current flowing from the network to the transformer.

Figure 8:
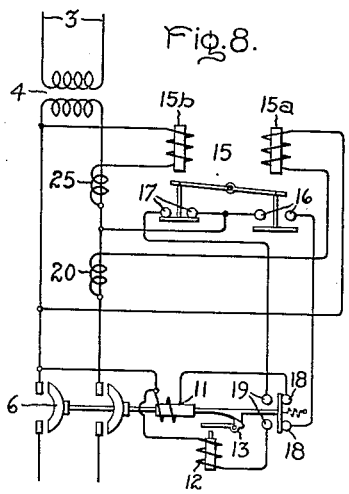

In Fig. 8 I have shown a modification of the arrangement shown in Fig. 7 in which the voltage winding of the torque-producing element 15a is connected across the secondary winding of the transformer 4 through a compensating transformer 20 in the manner shown in Fig. 2. It will be apparent that the arrangement shown in Fig. 8 operates in exactly the same manner as the arrangement shown in Fig. 7.

Figure 9:
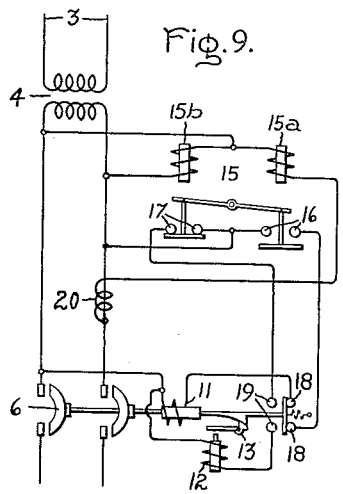

In Fig. 9 I have shown a modification of the arrangement shown in Fig. 6 in which the compensating transformer 20 supplies voltage to the winding of the torque-producing element 15a which is connected across the secondary winding of the transformer so that the torque-producing element 15a produces a torque which varies proportionally with the feeder terminal voltage of the transformer 4. The torque-producing element 15b produces a torque proportional to the secondary voltage of the transformer 4.

It will be apparent that the arrangement shown in Fig. 9 operates in exactly the same manner as the arrangement shown in Fig. 6.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a system of electric distribution including a high voltage alternating current feeder, a low voltage alternating current network, a transformer having primary and secondary circuits one of which is connected to said feeder, and a switch connecting the other circuit of said transformer to said network, a control arrangement for said switch including means dependent upon the greater decrease produced in the voltage of said feeder when a predetermined fault occurs on said feeder than is produced when a similar fault occurs on said network for opening said switch in response to said predetermined fault only when it occurs on said feeder.

2. In a system of electric distribution including two alternating current circuits, a transformer having primary and secondary circuits one of which is connected to one of said alternating current circuits, and a switch connecting the other circuit of said transformer to the other of said alternating current circuits, a control arrangement for said switch including means dependent upon the greater decrease produced in the voltage of said one of said alternating current circuits when a predetermined fault occurs on said one of said alternating current circuits than is produced when a similar fault occurs on said other of said alternating current circuits for opening said switch in response to said predetermined fault only when it occurs on said one of said alternating current circuits.

3. In a system of distribution including two alternating current circuits a transformer having primary terminals connected to one of said circuits and a switch for connecting the secondary terminals of said transformer to the other circuit, a control arrangement for said switch including opening means for said switch dependent upon a change in the voltage ratio of said transformer occurring in response to abnormally large current conditions in said one of said circuits and comprising voltage responsive means connected across one of said circuits 4. In a system of electric distribution including a high voltage alternating current feeder, a low voltage alternating current network, a transformer having two circuits one of which is connected to said feeder, and a switch connecting the other circuit of said transformer to said network, a control arrangement for said switch including means dependent upon the voltage of said feeder decreasing below a predetermined value for opening said switch.

5. In a system of electric distribution including a high voltage alternating current feeder, a low voltage alternating current network, a transformer having two sets of terminals one of which is connected to said feeder, and a switch connecting the other set of terminals of said transformer to said network, a control arrangement for said switch including a relay having a winding connected to said other set of terminals of said transformer, compensating means associated with said relay winding for causing the voltage applied to said relay winding to vary proportionally with the feeder terminal voltage of said transformer, and means controlled by said relay for opening said switch when the voltage applied to said relay winding decreases below a predetermined value.

6. In a system of electric distribution including a high voltage alternating current feeder, a low voltage alternating current network, a transformer having two sets of terminals one of which is connected to said feeder, and a switch connecting the other set of terminals of said transformer to said network, a control arrangement for said switch including a differential relay having two opposing torque-producing elements, voltage responsive means for energizing one of said elements so that it exerts a torque proportional to the feeder terminal voltage of said transformer, means for energizing the other of said elements so that it exerts a torque proportional to a predetermined electrical condition of said other set of terminals of said transformer, and means controlled by said relay for opening said switch.

7. In a system of electric distribution including a high voltage alternating current feeder, a low voltage alternating current network, a transformer having two sets of terminals one of which is connected to said feeder, and a switch connecting the other set of terminals of said transformer to said network, a control arrangement for said switch including a differential relay having two opposing torque-producing elements, means for energizing one of said elements so that it exerts a torque proportional to the feeder teminal voltage of said transformer, means for energizing the other of said elements so that it exerts a torque proportional to the magnitude of the current flowing through said other set of terminals of said transformer, and means controlled by said relay for opening said switch.

8. In a system of electric distribution including a high voltage alternating current feeder, a low voltage alternating current network, a transformer having two sets of terminals one of which is connected to said feeder, and a switch connecting the other set of terminals of said transfomer to said network, a control arrangement for said switch including a differential relay having two opposing torque-producing elements, voltage responsive means for energizing one of said elements so that it exerts a torque proportional to the feeder terminal voltage of said transformer, means for energizing the other of said elements so that it exerts a torque proportional to the magnitude of the voltage across said other set of terminals of said transformer, and means controlled by said relay for opening said switch.

9. In a system of electric distribution including a high voltage alternating current feeder, a low voltage alternating current network, a transformer having two sets of terminals, one of which is connected to said feeder, and a switch connecting the other set of terminals of said transformer to said network, a control arrangement for said switch including a differential relay having two opposing torque-producing elements, means for energizing one of said elements so that it exerts a torque proportional to the magnitude of the feeder terminal voltage of said transformer, means for energizing the other of said elements including a voltage winding connected across said other set of terminals of said transformer, compensating means for producing in the circuit of said voltage winding a bucking voltage when power flows from said transformer to said network and a boosting voltage when power flows from said network to said transformer, and means controlled by said relay for opening said switch.

10. In a system of electric distibution including a high voltage alternating current feeder, a low voltage alternating current network, a transformer having two circuits one of which is connected to said feeder, and a switch connecting the other circuit of said transformer to said network, a control arrangement for said switch including a differential relay having two opposing windings respectively energized by voltages proportional to the terminal voltages of said transformer, and means controlled by said relay for opening said switch.

11. In a system of electric distribution including a high voltage alternating current feeder, a low voltage alternating current network, a transformer having two circuits one of which is connected to said feeder, and a switch connecting the other circuit of said transformer to said network, a control arrangement for said switch including a differential relay having two opposing windings respectively connected across the terminals of said other windings of said transformer, compensating means for causing the voltage applied to one of said relay windings to vary proportionally with the feeder terminal voltage of said transformer, and means controlled by said relay for opening said switch.

DONALD L. BEEMAN.